(12) United States Patent
Zhou et al.

(10) Patent No.: US 6,625,205 B1
(45) Date of Patent: Sep. 23, 2003

(54) MATCHED FILTER CIRCUIT

(75) Inventors: Changming Zhou, Tokyo (JP); Kunihiko Suzuki, Tokyo (JP)

(73) Assignee: Yozan Corporation, Tokyo (JP)

( * ) Notice: Subject to any disclaimer, the term of this patent is extended or adjusted under 35 U.S.C. 154(b) by 0 days.

(21) Appl. No.: 09/332,198

(22) Filed: Jun. 14, 1999

(30) Foreign Application Priority Data

| Oct. 2, 1998 | (JP) | 10-280780 |
| Sep. 3, 1998 | (JP) | 10-250143 |
| Jun. 23, 1998 | (JP) | 10-192501 |

(51) Int. Cl.$^7$ ............................................. H04L 27/06
(52) U.S. Cl. ........................ 375/153; 375/343; 375/143; 370/335
(58) Field of Search ................................. 370/335, 331, 370/479; 375/150; 341/144; 73/620

(56) References Cited

U.S. PATENT DOCUMENTS

| 4,651,327 A | * | 3/1987 | Fujita | 370/479 |
| 4,739,304 A | * | 4/1988 | Takeda et al. | 341/144 |
| 6,130,906 A | * | 10/2000 | Davidovici et al. | 375/152 |
| 6,169,771 B1 | * | 1/2001 | Shou et al. | 370/335 |

FOREIGN PATENT DOCUMENTS

| EP | 0 756 378 A1 | 1/1997 |
| EP | 0 762 645 A1 | 3/1997 |
| EP | 0 939 500 A2 | 9/1999 |

\* cited by examiner

*Primary Examiner*—Stephen Chin
*Assistant Examiner*—Edith Yeh
(74) *Attorney, Agent, or Firm*—Armstrong, Westerman & Hattori LLP

(57) ABSTRACT

A matched filter having a set of registers to successively store a digital voltage. The matched filter includes a cumulative shift register, a number of exclusive-or circuits, and an analog adder. The cumulative shift register has a number of stages in which each stage has one bit corresponding to the shift register. The exclusive-or circuits each perform an exclusive-or function on each bit of the digital data and the one bit coefficient while the analog adder sums outputs from the exclusive-or circuits.

10 Claims, 21 Drawing Sheets

MATCHED FILTER CIRCUIT

DETAILED DESCRIPTION OF THE INVENTION

BACKGROUND OF THE INVENTION

1. Field of the Invention

The present invention relates to a matched filter circuit, particularly to a matched filter used in a signal reception apparatus of a direct sequence code division multiple access (DS-CDMA) communication system.

2. Prior Art

Recently, a spread spectrum communication system, particularly the DS-CDMA communication system, attracts attention in the field of mobile radio system and of cordless local area network (LAN).

In the DS-CDMA system, at a transmitter side, the transmission data is modulated and then spreaded by a PN-code, and at a receiver side, the received signal is despread by the PN-code so that the transmission data is reproduced. A sliding correlator or a matched filter is used for the despreading. The sliding correlator is small in circuit size but needs a long time for the correlation calculation. While, the matched filter is fast in correlation calculation but is rather big in circuit size.

The conventional matched filter consists of a charge coupled device (CCD), a surface acoustic wave (SAW) device, or a digital circuit. A matched filter is proposed in a Patent Publication Hei06-164320 by the inventors of the present invention, which consists of an analog circuit and is of high speed as well as low power consumption. The matched filter includes a sampling and holding circuit for holding a plurality of input analog signals as discrete data, a plurality of multiplication circuits for multiplying the analog signals by multipliers that are shifted and circulated and an adder for summing the multiplied data up.

The matched filter is of a large circuit size because a lot of sampling and holding circuits and peripheral circuits such as refreshing circuits are needed.

SUMMARY OF THE INVENTION

The present invention has an object to provide a matched filter circuit of small circuit size with preserving the characteristics of low power consumption.

A matched filter according to the present invention includes an A/D converter for converting successive analog input voltage signals into a digital voltage signals and calculates multiplication and addition of the successive digital signals. The addition is performed by an analog current addition circuit, an analog voltage addition circuit or a digital voltage addition circuit.

PREFERRED EMBODIMENTS

Hereinafter, preferred embodiments of matched filter circuits according to the present invention are described with reference to the attached drawings.

Figure 1:
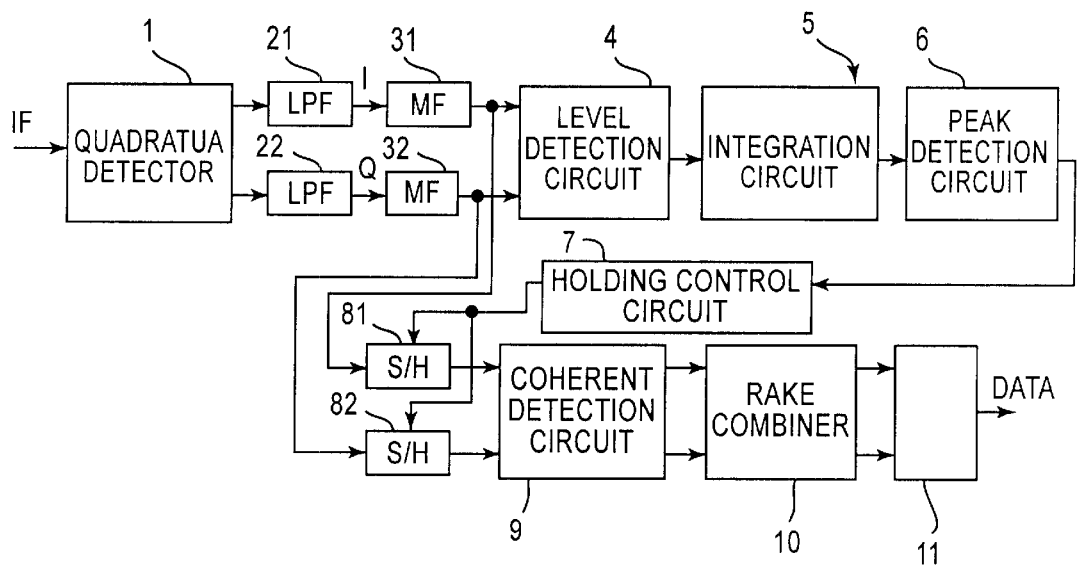
FIG. 1 is a block diagram showing a signal reception circuit of a DS-CDMA communication system using a first embodiment of a matched filter according to the present invention.

FIG. 1 is a block diagram showing a signal reception circuit of a DS-CDMA communication system using a first embodiment of a matched filter according to the present invention.

In FIG. 1, 1 is a quadrature detection circuit which detects an intermediate frequency (IF) signal and separates the IF signal into an in-phase component (I-component) and a quadrature component (Q-component). 31 and 32 are matched filters receiving I- and Q-components from the quadrature detector 1 through low-pass filters 21 and 22, and despreads the components. Despread outputs of the matched filter circuits 31 and 32 are input to sampling and holding circuits 81 and 82 and to level detection circuit 4.

The level detection circuit 4 calculates an electric power of the output from the matched filters 31 and 32, and converts the electric power into a digital signal. An output of the level detection circuit 4 is averaged by recurrent integration for a time period of a plurality of symbols in a recurrent integration circuit 5. Peak timing of peaks are extracted higher than a predetermined threshold in a peak detection circuit 6. A number "n" of the peaks extracted is for example "4" at most. An output of the peak detection circuit 6 is input to a sampling and holding control circuit 7 which determines a sampling timing of the sampling and holding circuits 81 and 82, synchronously to the phase of the peaks extracted. The I- and Q-components of the despread output corresponding to the peaks higher than the threshold are held in the sampling and holding circuits 81 and 82 in response to a control signal of the sampling and holding control circuit 7.

Figure 2:
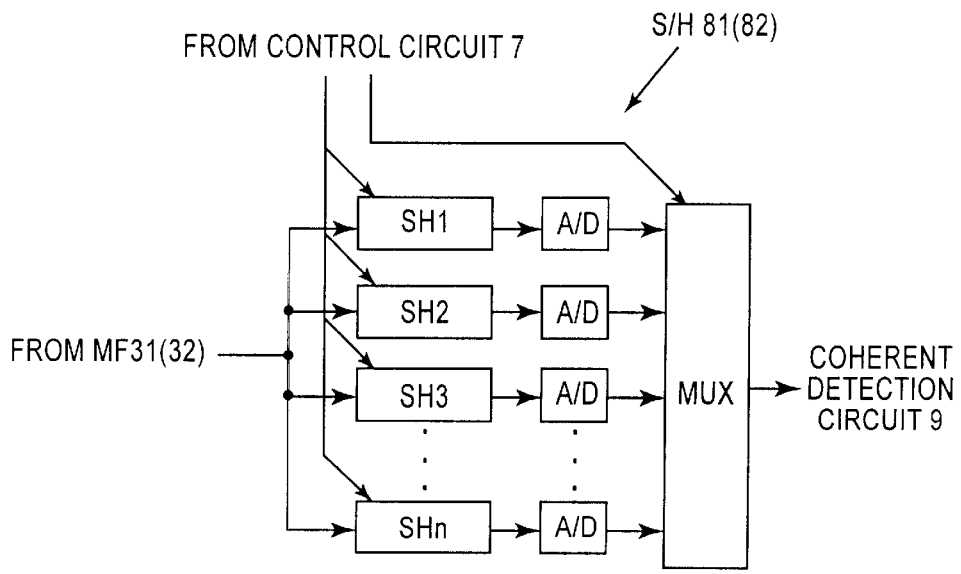
FIG. 2 is a general block diagram of the first embodiment.

FIG. 2 is a general block diagram of the first embodiment having a sampling and holding circuits 81. Since the sampling and holding circuit 82 is similar to the sampling and holding circuit 81, a description therefor is omitted. The sampling and holding circuit 81 includes n number of sampling and holding circuits SH1 to SHn parallelly connected to inputs of the matched filter circuit 31, a plurality of A/D converters which convert outputs of the sampling and holding circuits SH1 to SHn into analog signals, and a multiplexer which selectively output one of outputs of the A/D converters to a coherent detection circuit 9.

The coherent detection circuit 9 detects the peaks of the correlation by the matched filters 31 and 32. These peaks are combined with synchronization by a rake combiner 10, and outputs from an output interface (IF) as a demodulated data.

Therefore, correlation peaks of predetermined number of paths are sampled and held, and the electric power is decreased.

Figure 3:
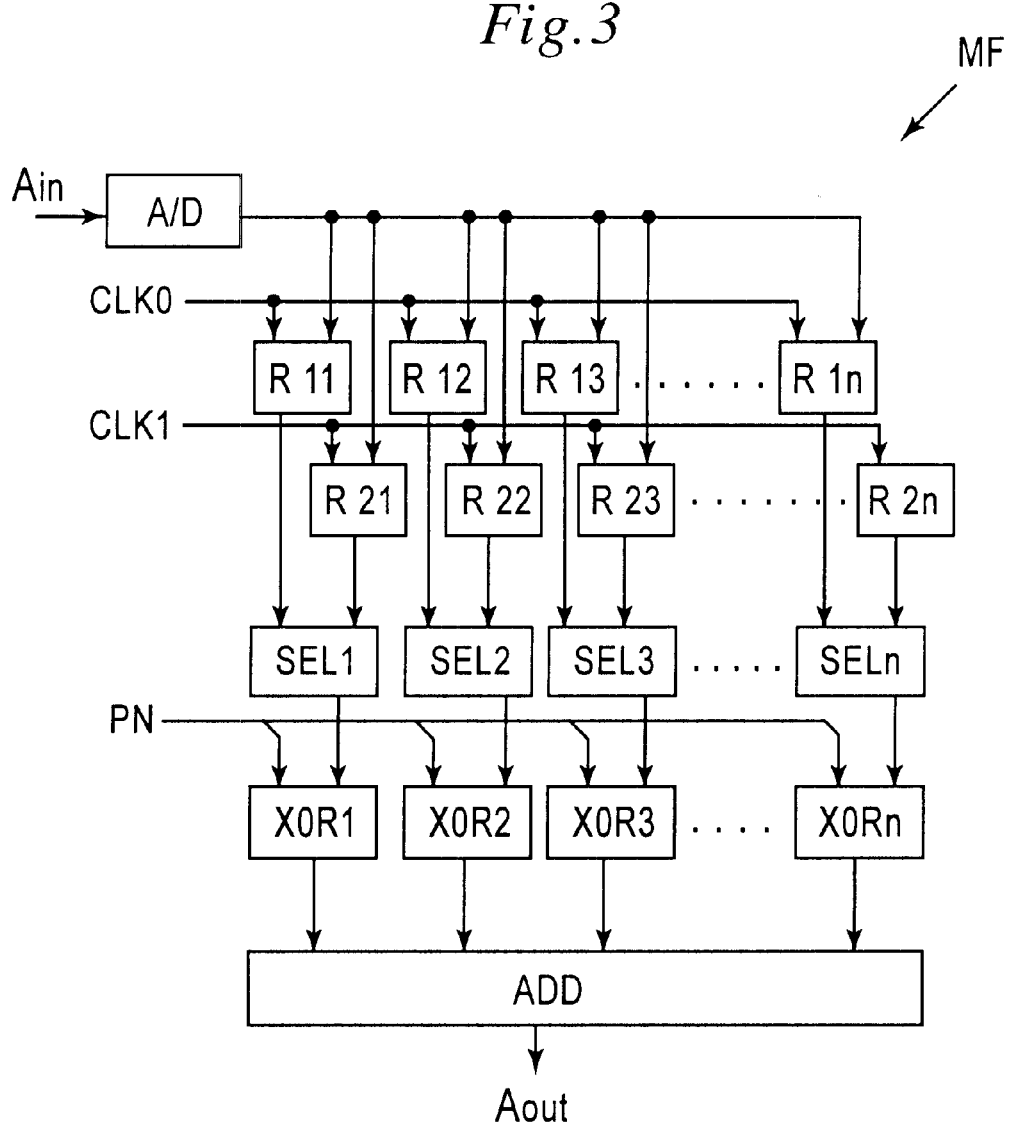
FIG. 3 is a detailed block diagram showing the first embodiment.
Figure 3:
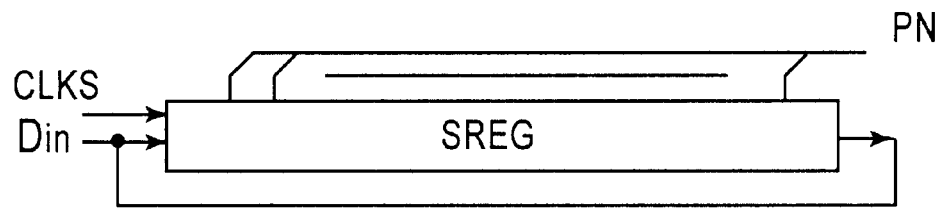

FIG. 3 is a detailed block diagram showing the first embodiment of the matched filters 31 and 32. The matched filter MF includes an A/D converter (shown by A/D) receiving an analog input signal Ain corresponding to the I- or Q-component in FIG. 1. An output of the A/D converter is input to data register sequences R11 to R1n and R21 to R2n parallelly. The data registers R11 to R1n are controlled by a clock CLK0 so that one and only one of the date registers samples the output of the A/D converter at a time. The data registers R21 to R2n are controlled by a clock CLK1 which is shifted by half an chip time from CLK0 so that one and only one of the data registers holds the output of the A/D converter at one time. Therefore, a double sampling is performed.

Selectors SEL1 to SELn and exclusive-or-gates XOR1 to XORn are disposed corresponding to the data registers R11 and R1n and corresponding to the data registers R21 to R2n. The outputs of the date registers R11 and R21 are input to the selector SEL1, the outputs of the date registers R12 and R22 are input to the selector SEL2, and the outputs of the data registers R1n and R2n are input to the selectors CLKS SELn. Each of the selectors SEL1 to SELn are controlled for selectively outputting one of the connected data registers R11 to R1n, or R21 to R2n.

The outputs of the selectors SEL1 to SELn are input to the corresponding exclusive-or-gates XOR1 to XORn. Each of the exclusive-or-gates XOR1 to XORn is a circuit for calculating a logical exclusive-or of each bit of the digital data output from the corresponding data register with a one-bit data of PN code sequence. When the bit of the PN code sequence is "1", corresponding outputs of the outputs from the SEL1 to SELn are passed through the exclusive-or gate as they are. When the bit of the PN code sequence is "0", each bit of the corresponding outputs of the outputs from the SEL1 to SELn are reversed and output from the exclusive-or gate.

The PN code sequence is stored in a shift register SREG a last stage of which is fed back to its first stage. A clock CLKS synchronous with the clocks CLK1 and CLK2 is input to the shift register SREG such that the PN code sequence is shifted and circulated corresponding to the data input to the data registers from the A/D converter.

When a new PN code sequence is to be loaded in the shift register SREG, the new data is serially input to a data input terminal Din of the shift register SREG in response to the clock CLKS.

The outputs of the exclusive-or-gates are input to a current addition circuit ADD which outputs an analog signal $A_{out}$ corresponding to a total summation of the outputs of the exclusive-or gate. The analog current signal $A_{out}$ is output to the level detection circuit 4 and the sampling and holding circuits 81 or 82.

The circuit size of the matched filter is smaller than the conventional circuit because the multiplication in the matched filter circuit MF is processed by the digital circuit. The electric power consumption is also decreased. The addition by the current addition circuit ADD is of high speed and of high accuracy.

If a single sampling is performed, only one of the data register sequences is used and the selectors SEL1 to SELn are omitted. Or more than two data register sequences can be used for higher order over-sampling.

Figure 4:
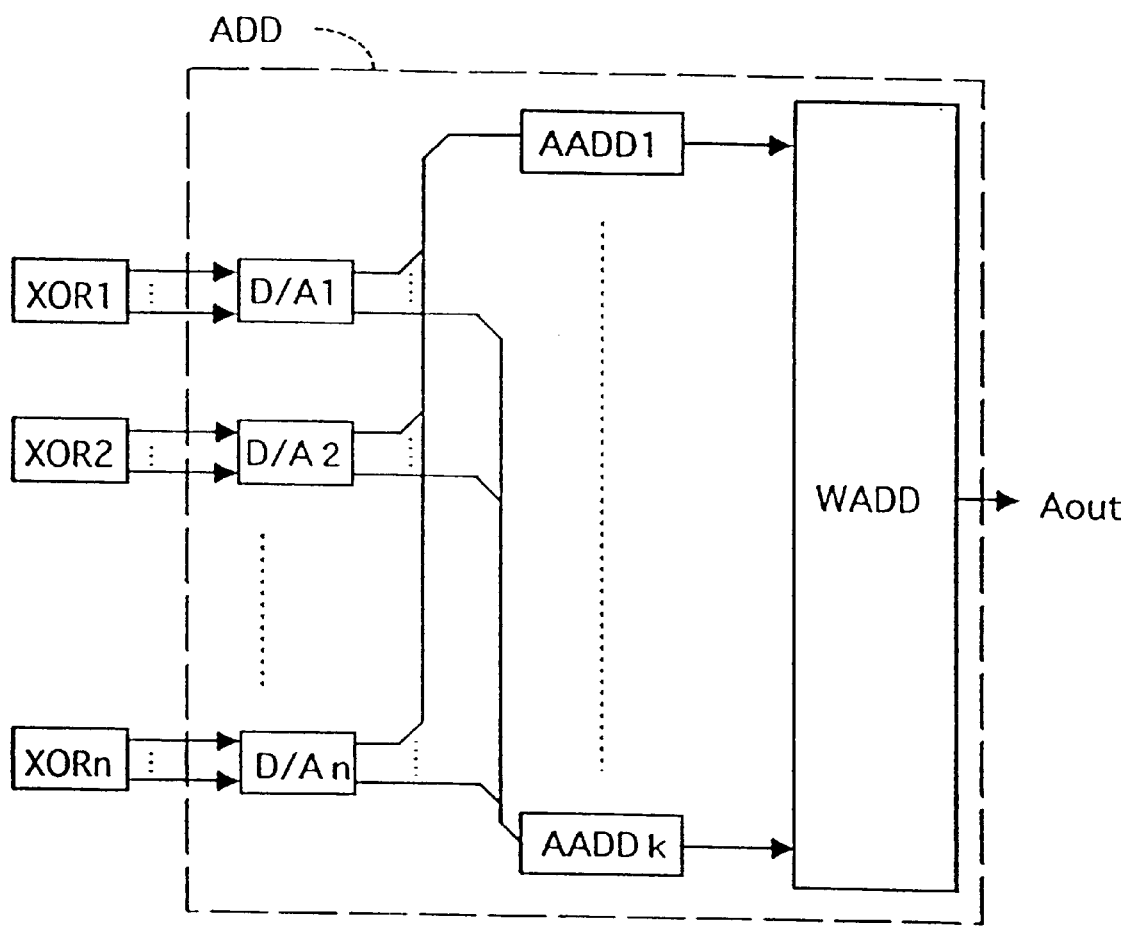
FIG. 4 is a block diagram showing a current addition circuit of the first embodiment.

FIG. 4 is a block diagram showing a current addition circuit. The current addition circuit ADD includes a plurality of D/A converters D/A1 to D/An corresponding to XOR1 to XORn, each of which converts the digital voltage signal of each bit of the output of the corresponding exclusive-or-gate into an analog current signal.

When the outputs of XOR1 to XORn are "k" bits digital data, the current signals are classified into "k" number of groups corresponding to "k" bits. The analog current signals corresponding to LSB are input to an analog bit addition circuit AADD1, the analog current signals corresponding to the second bit from LSB are input to an analog bit addition circuit AADD1, . . . , the analog current signals corresponding to MSB are input to an analog bit addition circuit AADDk. Outputs of the analog bit addition circuits AADD1 to AADDk are inputs to a current mode weighting addition circuit WADD which multiplies the outputs by weights corresponding to the weights of bits and sums them up. An output Aout of an analog current signal corresponding to a total summation of the outputs of the exclusive-or circuits XOR1 to XORn.

Figure 5:
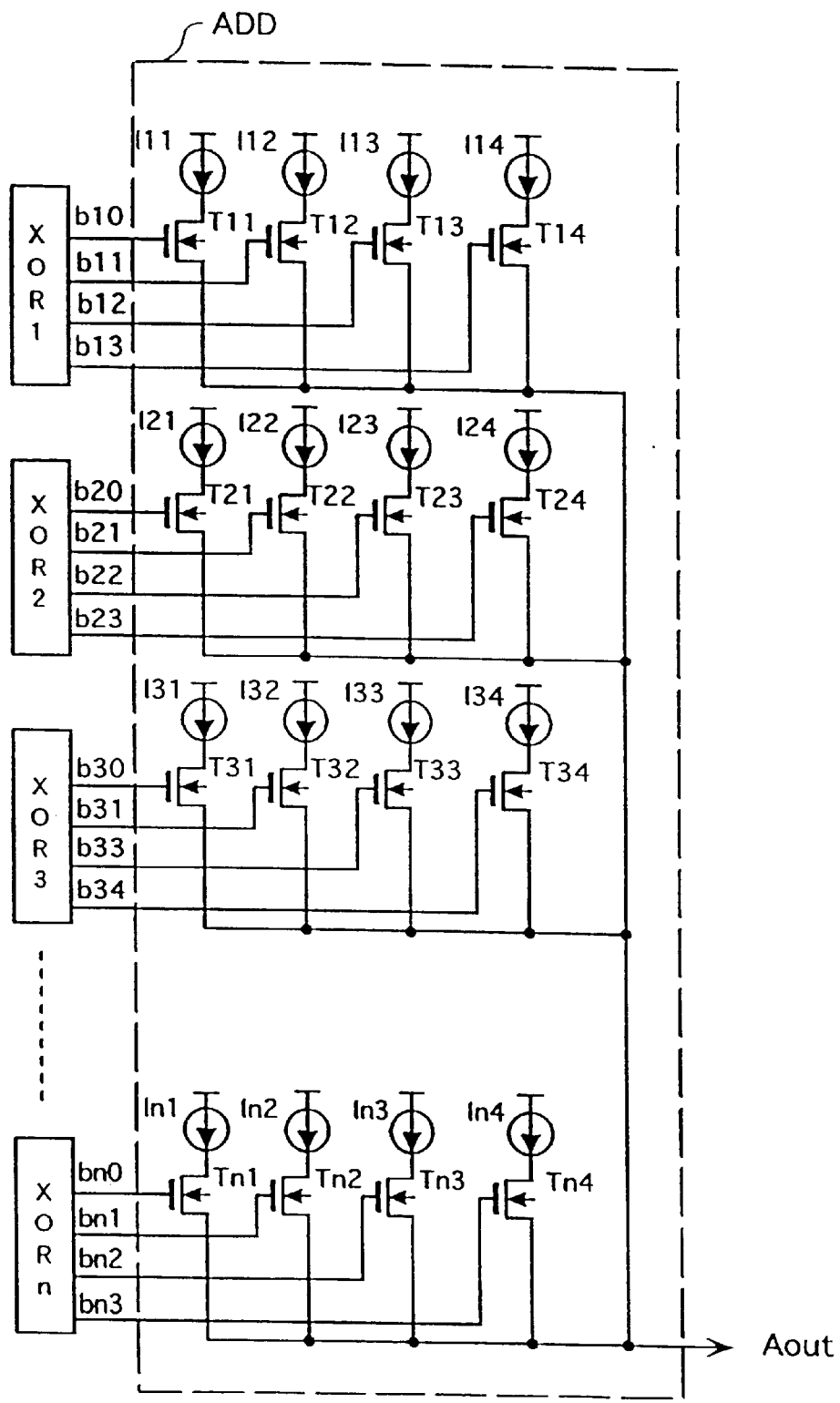
FIG. 5 is a circuit diagram showing the current addition circuit in FIG. 4.

FIG. 5 is a circuit diagram showing the current addition circuit ADD in FIG. 4. The number of bits of the outputs of the exclusive-or-gates XOR1 to XORn is 4 bits as an example, that is, XOR1 outputs 4 bits of b10, b11, b12, b13, XOR2 outputs 4 bits of b20, b21, b22, b23, . . . , XORn outputs 4 bits of bn0, bn1, bn2, bn3. Each bit "bi,j−1" (jth bit of XORi) of these bits is input to a switch Ti,j which consists of a nMOS transistor and receives the bit at its gate. The switch Ti,j is closed when the bit bi,j−1 is high level. Each switch Ti,j is connected at the drain with a constant current source Iij which outputs a predetermined current when the corresponding switch Ti,j is closed. The source of the switches area commonly connected to an output Aout for outputting a total current flowing through the switches closed, as an analog value corresponding to the total summation. The constant current sources connected to the second bits bi1 output a current twice as large as the constant current sources of the LSBDO. The constant current four times as large as sources connected to the third bits bi2 output a current the constant current sources of the LSBDO. The constant current sources connected to the fourth bits bi3 output a current eighth as that of the current of the constant current sources of the LSB. Therefore, the currents are weighted corresponding to the weight of bits of the binary number.

Figure 6:
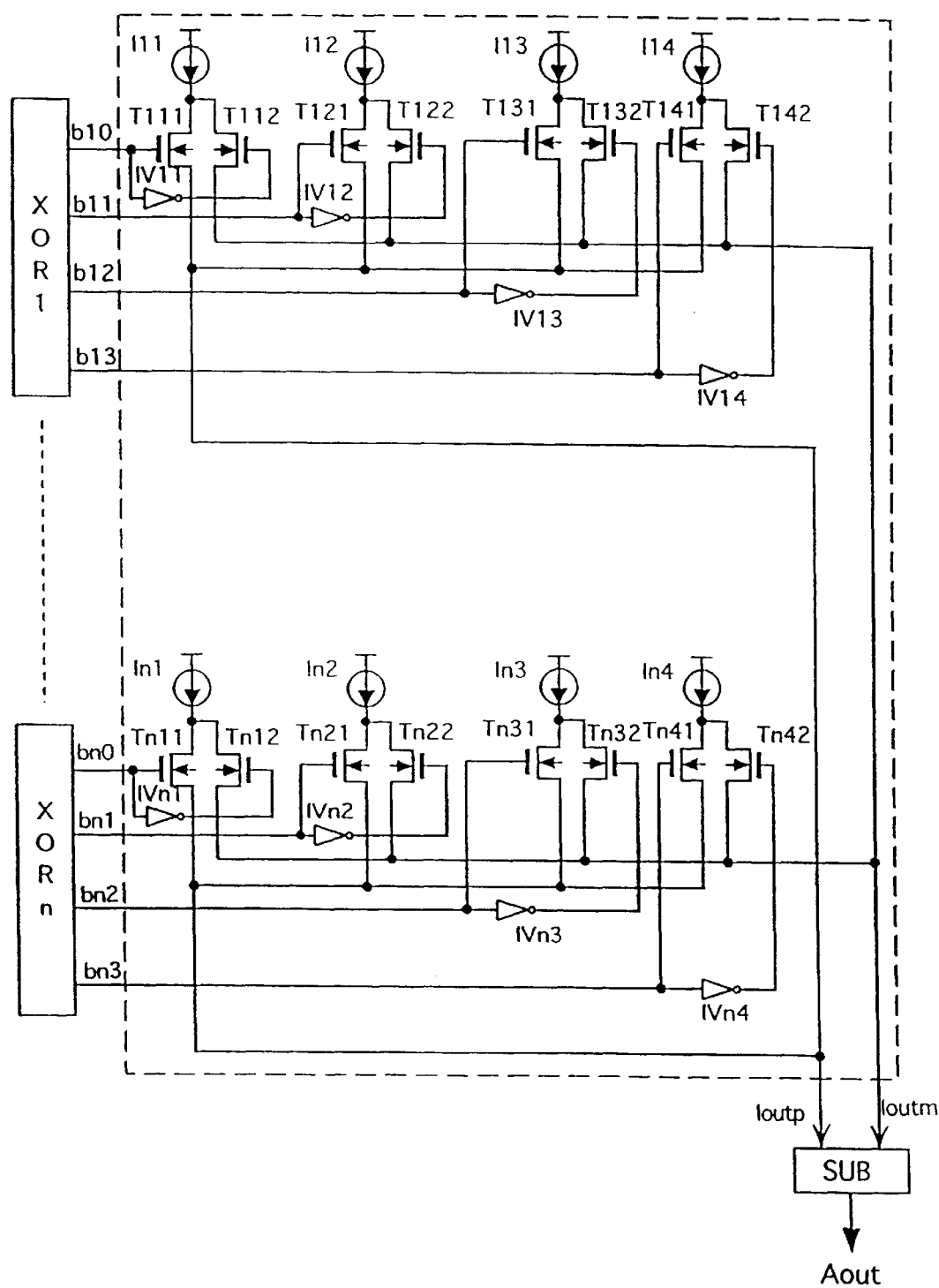
FIG. 6 is a circuit diagram showing another current addition circuit.

FIG. 6 is a circuit diagram showing another current addition circuit. Similar components to those in FIG. 5 are designated by the same references as in FIG. 5. Each bit bi,j−1 of the outputs from XORj to XORn is connected to a pair of switches Tij1 and Tij2 consisting of nMOSs. The switches Tij1 and Tij2 are connected at their drains to a constant current source Iij. The switches Tij1 and Tij2 are connected at their sources to positive and negative terminals Ioutp and Ioutm of a subtraction circuit SUB. The bit bi,j−1 is directly connected to the switch Tij1 and is connected through an inverter IVij to the switch Tij2. The switch Tij1 is closed when bij−1 is high level and the switch Tij2 is closed when bij−1 is low level. The subtraction circuit SUB subtract a total summation of current input to Ioutm from a total summation of current input to Ioutp such that an offset current is cancelled. A correlation peak has a level about an upper or a lower limit of the output of the subtraction circuit SUB.

Figure 7:
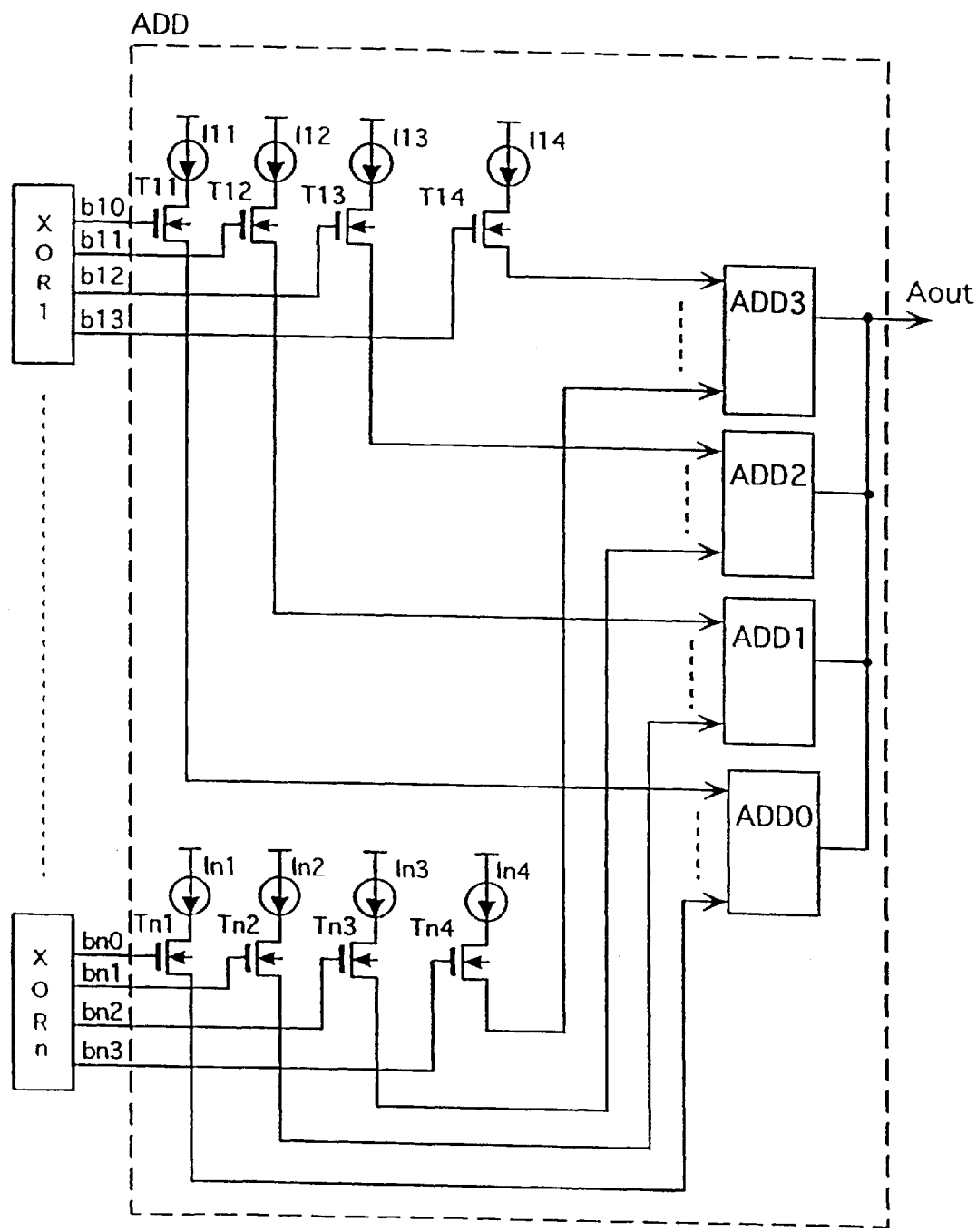
FIG. 7 is a circuit diagram showing further another current addition circuit.

FIG. 7 is a circuit diagram showing further another current addition circuit. Similar components to those in FIG. 5 are designated by the same references as in FIG. 5. Each bit bi,j−1 of the outputs from XORj to XORn is connected to a switches Tij consisting of nMOS. The switch Tij are connected at its drain to a constant current source Iij at its source to a bit addition circuit ADDj. The bit addition circuit ADDj calculates a total summation of currents through the switches Tij (i=1 to n) closed, and multiplies the total summation by weights corresponding to the weights of bits. Since the weighting is performed by the bit addition circuits ADD0 to ADD3, it is unnecessary to change the currents of the constant current sources and the circuit is simplified.

Figure 8:
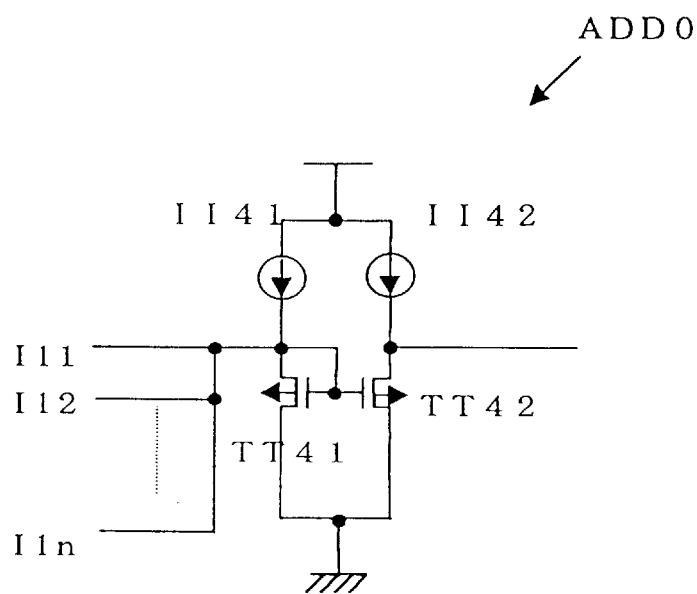
FIG. 8 is a circuit diagram showing a bit addition circuit used in the current addition circuit in FIG. 7.

FIG. 8 is a circuit diagram showing a bit addition circuit ADD0 used in the current addition circuit in FIG. 7. Since the other bit addition circuits are similar to ADD0, descriptions therefor are omitted. The bit addition circuit ADD0 consists of a current amplifying circuit, which includes a switch TT41 receiving the total LSBs I11 to In1 of the outputs from XOR1 to XORn. A switch TT42 of the same polarity as TT41 is connected at its gate to a gate of T41. The total LSBs are also input to the gate of TT42. A constant current sources II41 and II42 are connected to sources of the switches TT41 and TT42, respectively. When the currents of the constant current sources II41 and II42 are different, a source current of the switch TT42 is a current of the total summation of the input currents I11 to I1n multiplied by $$\frac{II42}{II41}$$

(II41: current of the current source II41/II42: current of the current source I142). In the circuit of FIG. 8, II41=II42. The bit addition circuits ADD1 to ADD3 have multipliers $$\frac{II42}{II41}$$

of "2", "4" and "8", respectively.

Figure 9:
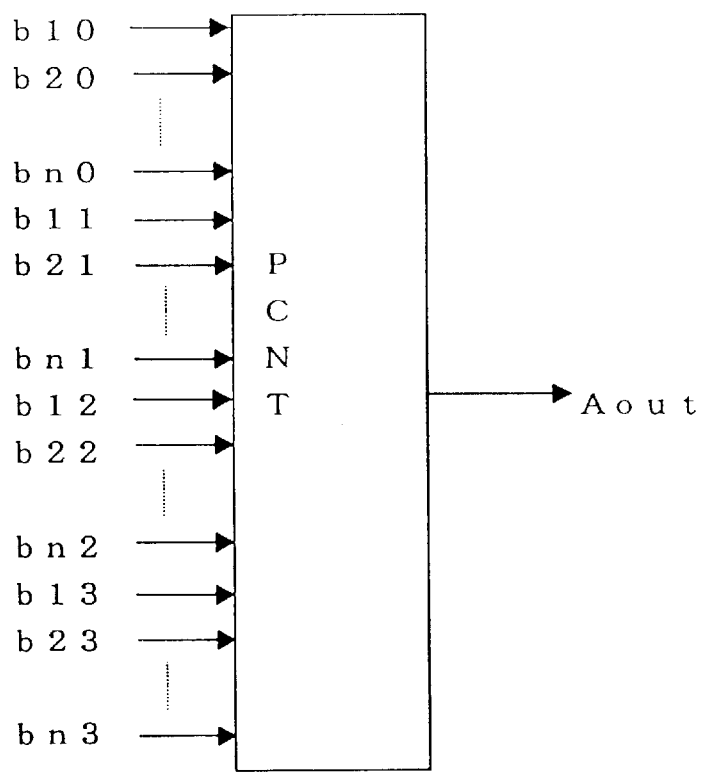
FIG. 9 is a block diagram showing an analog voltage addition circuit.

FIG. 9 is a block diagram showing an analog voltage addition circuit. In this circuit, a digital parallel counters PCNT is provided which count number of bits of "1" in the input digital data from the corresponding exclusive-or circuits XOR1 to XORk. The digital parallel counter may be substituted by a circuit shown in the Technical Report of IEICE, CAS94-103, VLD94-119, ICD94-227 (1995–03), "Design of a Multiplier with Parallel Counters Using NeuMOS" written by Tomomi NAKAGAWA et. al.

Figure 10:
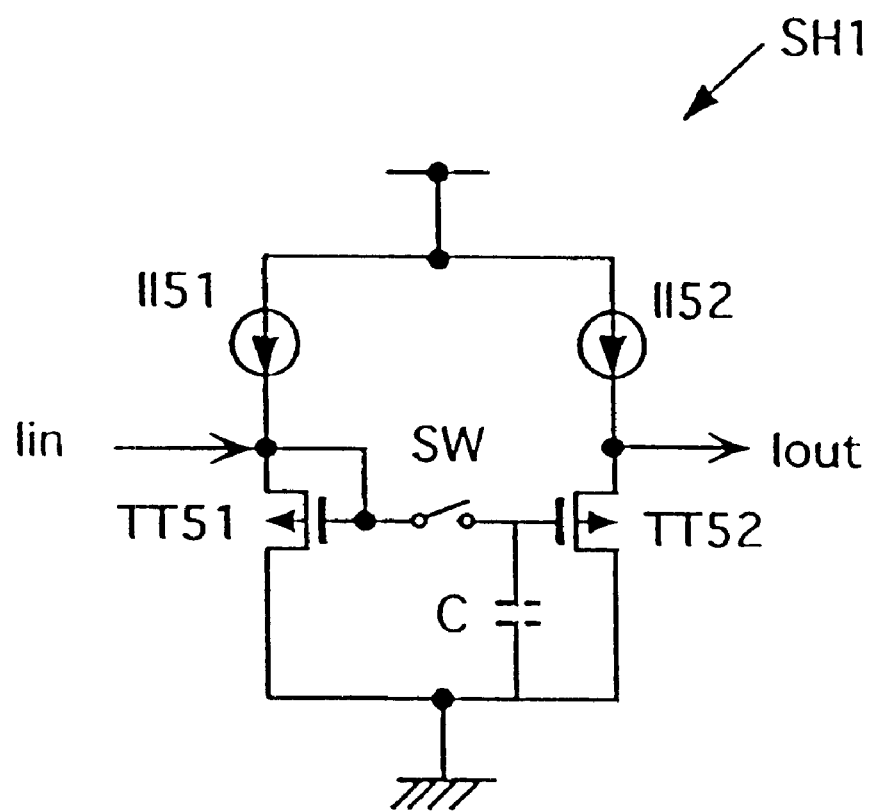
FIG. 10 is a circuit diagram showing a sampling and holding circuit of the matched filter.

FIG. 10 is a circuit diagram showing the sampling and holding circuit SH1 in FIG. 2. Since sampling and holding circuits SH2 to SHn are similar to SH1, descriptions therefor are omitted. The sampling and holding circuit SH1 includes MOS transistors TT51 and TT52, constant current sources II51 and II52, a switch SW. A drain and gate of the MOS transistor TT51 are connected with each other, and the switch SW is connected between the gate of TT51 and the gate of TT52. The switch SW is controlled to be switched by a control signal from the sampling and holding control circuit 7.

Figure 11:
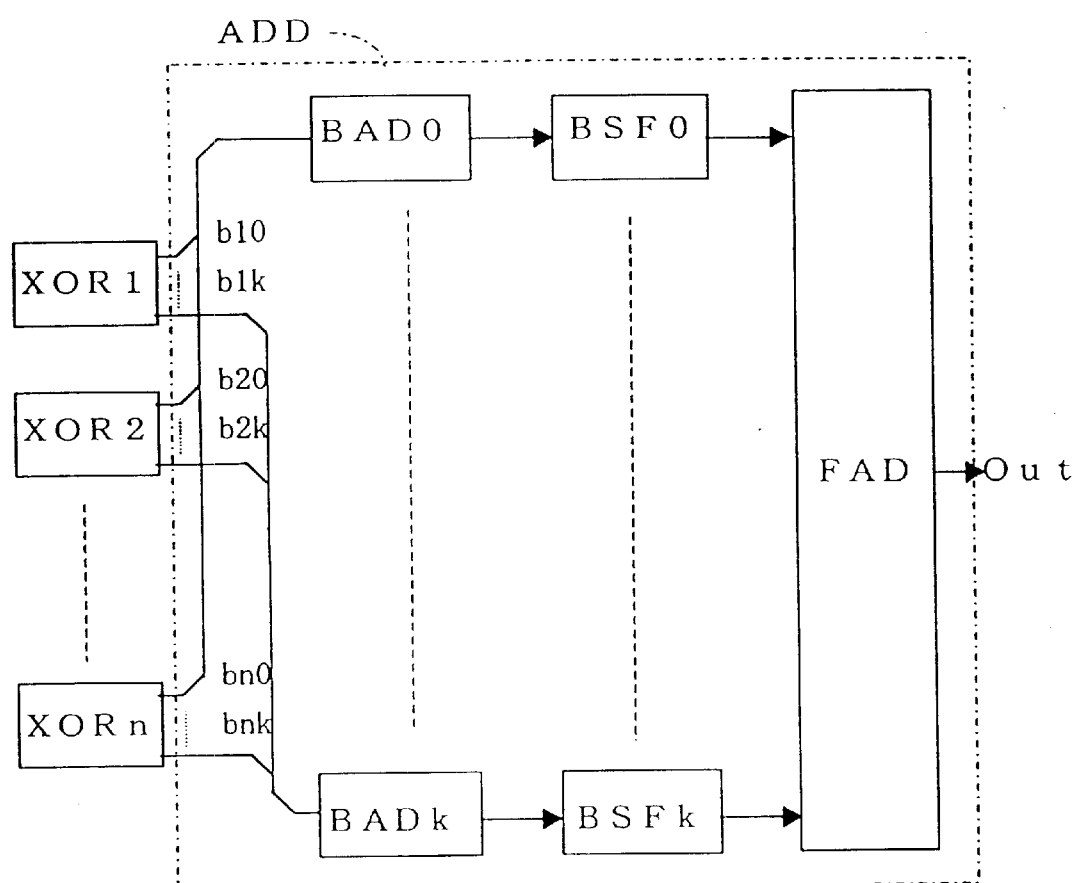
FIG. 11 is a circuit diagram showing a digital voltage addition circuit.

FIG. 11 is a circuit diagram showing a digital voltage addition circuit ADD. The outputs b10~b1k, b20~b2k, . . . , bn0~bnk from the exclusive-or circuits XOR1 to XORn are input to bit-addition circuits BAD0 to BADk, respectively, of the adder ADD. Outputs of the bit-addition circuits BAD0 to BADk are input to shifters BSF0 to BSFk, respectively. Each of the bit-addition circuits BAD0 to BADk sums corresponding bits of the total exclusive-or circuits XOR1 to XORn up, for example, BAD0 sums b10, b20, . . . , bn0 up. Each of the shifter BSF0 to BSFk performs bit-shifting of corresponding outputs of the bit-addition circuits BAD0 to BADk by one or more bits according to weights of the bits input to the shifter. The numbers of bits to be shifted are 0, 1, 2, . . . , k for weights $2^0$, $2^1$, . . . , $2^k$ of bit groups b1o to bno, b2o to b2n, . . . , and bk0 to bkn. Outputs of the shifters BSF0 to BSFk are summed by a final adder FAD up.

The bit-addition circuits BAD0 to BADk may be constructed by the digital parallel counters which count number of bits of "1" in the input digital data from the corresponding exclusive-or circuits XOR1 to XORk, as mentioned above. The digital parallel counter may be substituted by the circuit shown in the Technical Report of IEICE, CAS94-103, VLD94-119, ICD94-227 (1995–03), "Design of a Multiplier with Parallel Counters Using NeuMOS" written by Tomomi NAKAGAWA et. al.

Figure 12:
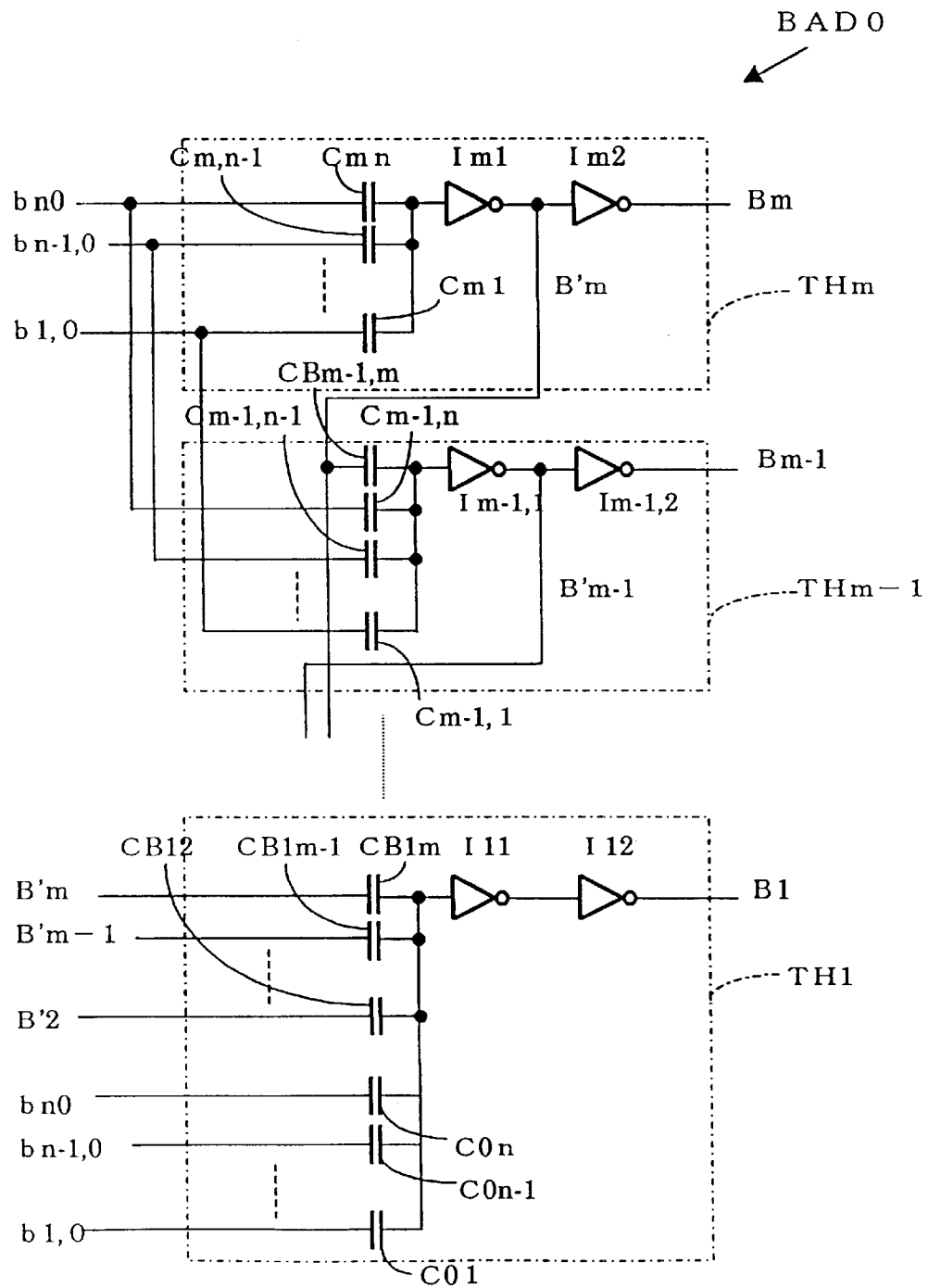
FIG. 12 is a circuit diagram showing a bit addition circuit of the digital voltage addition circuit in FIG. 11.

FIG. 12 shows a threshold type bit-addition circuit corresponding to the above bit-addition circuit BAD0. There are provided a plurality of threshold type bit-addition circuits corresponding to number (k+1) of input bits. One threshold type bit addition circuit includes m number of thresholding circuits TH1 to THm.

$$m = \text{int}\left[\frac{\log(n-1)}{\log 2}\right] + 1 \quad (1)$$

BAD0 generates a m bit digital data as a total summation of input LSBs. The threshold circuit THm outputs Bm as MSB of the digital data, THm−1 outputs the second bit Bm−1, . . . , TH1 outputs the LSB B1. A capacitive array consisting of a plurality of parallel capacitances is connected to the thresholding circuits TH1 to THm. The total LSBs b10 to bn0 of the exclusive-or circuits XOR1 to XORn are input to the total thresholding circuits, The thresholding circuits TH1 to THm−1 of the second bit and the higher bits receive outputs from upper thresholding circuits TH2 to THm through inverters. The inverted outputs of the outputs B1 to Bm are designated B'1 to B'm, here. The thresholding circuit THm−2 receives b10 to bn0, B'm and B'm−1, . . . , TH1 receives b10 to bn0 and B'm to B'2.

The thresholding circuits TH1 to THm include inverters or comparators I11 to Im1, respectively, corresponding to output bits B1 to Bm, and the capacitive array is connected to inputs of these inverters. Outputs of the inverters I11 to I1m are connected to inverters I21 to I2m, respectively. The outputs B1 to Bm are output from the inverters I21 to I2m, the outputs B'1 to B'm are output from the inverters I11 to I1m.

In the thresholding circuit TH1, the capacitive array includes capacitances C01 to C0n of the same capacities corresponding to a threshold of TH1, which are connected to B1,0 to Bn0. Capacitances CB12 to CB1m connected to B'2 to B'm have capacities corresponding to thresholds of thresholding circuits TH2 to THm. The inverters I11 to I1m have a threshold VT=Vdd/2, and a relationship between capacitances is as in the formula (2).

$$C01 = C02 = \ldots = C0n = 2CB1m = 2^2 CB1m-1 = \ldots = 2^{m-1} CB12 \quad (2)$$
$$\vdots$$
$$CB_m-1, 1 = \ldots = Cm-1, n-1 = Cm-1, n = 2CBm-1, m$$
$$CBm1 = \ldots = Cm, n-1 = Cmn$$

The outputs of TH1 to THm are expressed by the formula (3) using a Gaussian notation [ ]. When the input exceeds the threshold VT, the thresholding circuits output "1", otherwise "0". Other bit-addition circuits BAD1 to BADk are similar to BAD0, and descriptions therefor are omitted.

$$Bm = \left[ \frac{\sum_{i=1}^{n} b_{i,0} \times C_{m,j}}{\sum_{j=1}^{n} C_{m,j}} \right] \quad (3)$$

$$Bm-1 = \left[ \frac{\sum_{i=1}^{n} b_{i,0} \times C_{m-1,j} + B'_m \times CB_{m-1,m}}{\sum_{j=1}^{n} C_{m,j} + CB_{m-1,m}} \right]$$

$$\vdots$$

$$B0 = \left[ \frac{\sum_{i=1}^{n} b_{i,0} \times C_{0,j} + \sum_{j=1}^{m} B'_j \times CB_{1,j}}{\sum_{j=1}^{n} C_{0,j} + \sum_{j=2}^{m} CB_{1,j}} \right]$$

Figure 13:
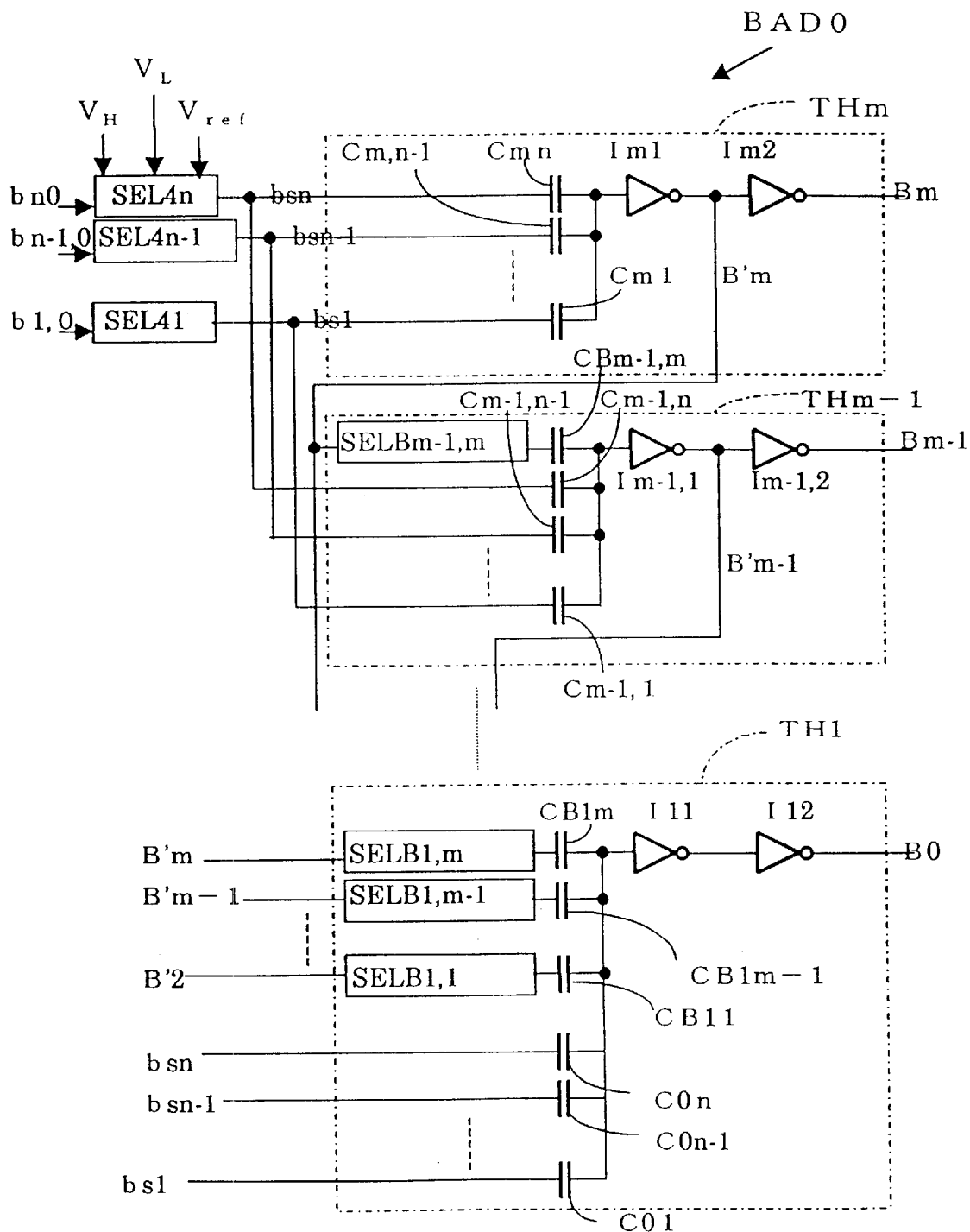
FIG. 13 is a circuit diagram showing another bit addition circuit of the digital voltage addition circuit in FIG. 11.

FIG. 13 shows a variation of one of the threshold type bit-addition circuit BAD0. In this bit-addition circuit BAD0, the outputs from the exclusive-or circuits are indirectly input to the capacitive array, that is, the outputs are input to selectors SEL41 to SEL4n and outputs of these selectors are input to the capacitive array. The selector SEL4n receives a reference high voltage VH and a reference low voltage VL such that one of the reference voltages is output in response to the input. By converting the input voltage into the reference voltage, the calculation accuracy of the bit-addition circuit BAD0. The outputs of the selector SEL41 to SEL4n are input to the capacitances of the capacitive array; and inverted outputs of the threshold circuits are input through similar selectors (SELBm-1, m, . . . , SELB1m, SELB1,m-1, . . . , SELB1,1) to the capacitive arrays of the lower bits.

The selectors SEL4m1 to SEL4mn outputs the reference voltage Vref corresponding to the threshold voltage, when the inverter Im1 is short-circuited at its input and output. Thus, the reference voltage Vref is input to the total capacitances of the capacitive array for refreshing the residual electric charge such that the calculation accuracy is improved.

Figure 14:
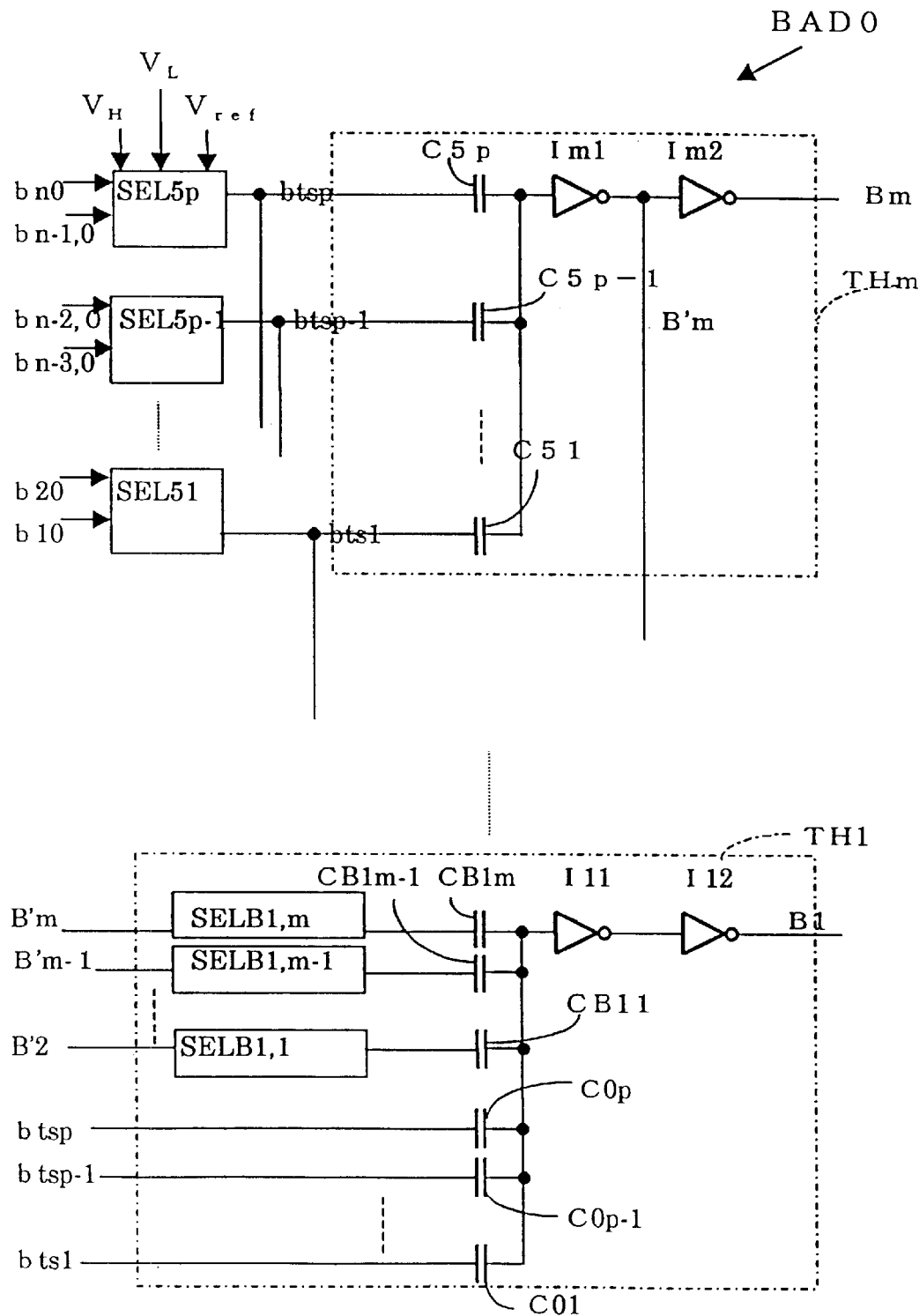
FIG. 14 is a circuit diagram showing further another bit addition circuit of the digital voltage addition circuit in FIG. 11.

FIG. 14 shows the second variation of the bit-addition circuit. In this embodiment, one selector is connected to a pair of output bits, that is, there are p=n/2 selectors SEL51 to SEL5p. The selector SEL51 is controlled to output a three-levels voltage (VH, Vref, VL) corresponding to two input bits b10 and b20. The number of inputs of the capacitive array becomes a half of that in the above embodiment by the multi-level input.

Figure 15:
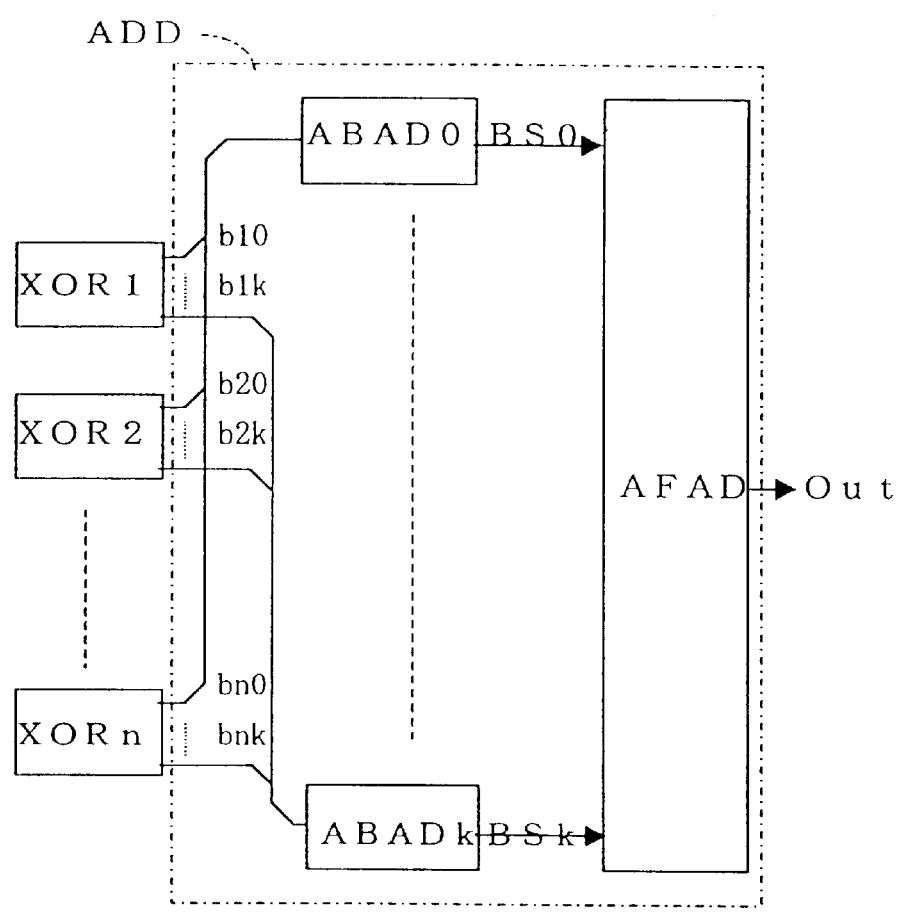
FIG. 15 is a circuit diagram showing another digital voltage addition circuit.

FIG. 15 shows the second embodiment using an analog type adder instead of the digital type adder. The adder ADD includes a analog-bit-adder ABAD0 to ABADk corresponding to outputs b10 to b1k, b20 to b2k, . . . , bn0 to bnk, respectively, each of which performs analog addition.

Figure 16:
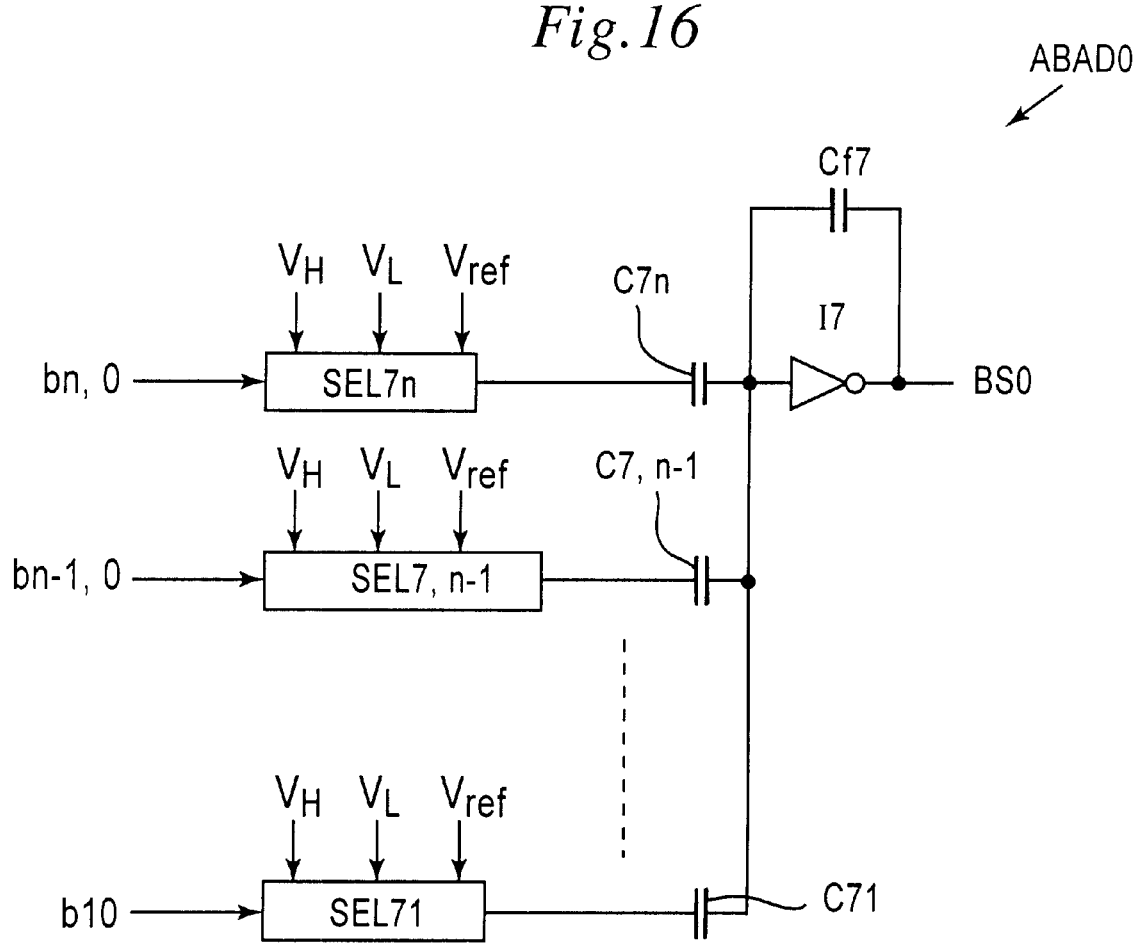
FIG. 16 is a circuit diagram showing a bit addition circuit of the digital voltage addition circuit in FIG. 15.

FIG. 16 shows one bit-addition circuit ABAD0. The bit-addition circuit ABAD0 includes selectors SEL71 to SEL7n receiving bits b10 to bn,0, each of which outputs VH or VL alternatively. The calculation accuracy is high due to the reference voltage conversion. The outputs of the selectors SEL71 to SEL7n are input to capacitances C71 to C7n, corresponding to the selectors, of a capacitive array. An output of the capacitive array is input to an inverting amplifier 17 output of which is fed through a feedback capacitance Cf7 back to its input. The capacitances C71 to C7n are equal in their capacities, and the capacitance Cf7 has a capacity equal to the total capacity of the capacitances C71 to C7n. Thus the output BS0 of the bit-addition circuit is a bit-addition shown in the formula (4). In the formula (4), Vb is a threshold voltage of the inverting amplifier.

$$BS0 = -\frac{\sum_{i=1}^{n}(bi0 \cdot VH - \overline{bi0} \cdot VL) \cdot C7i}{Cf7} + 2 \cdot Vb \quad (4)$$

$$= -\frac{\sum_{i=1}^{n}(bi0 \cdot VH - \overline{bio} \cdot VL)}{n} + 2 \cdot Vb$$

The bit-addition circuits are similar to ABAD1 to ABADk, so the descriptions therefor are omitted.

The selectors SEL71 to SEL7n are allowed to output Vref, and the C71 to C7n and C75 are refreshed by inputting Vref to I7 when Cf7 is short-circuited. The residual electrical charge is canceled and the calculation accuracy is improved by the refreshing.

Figure 17:
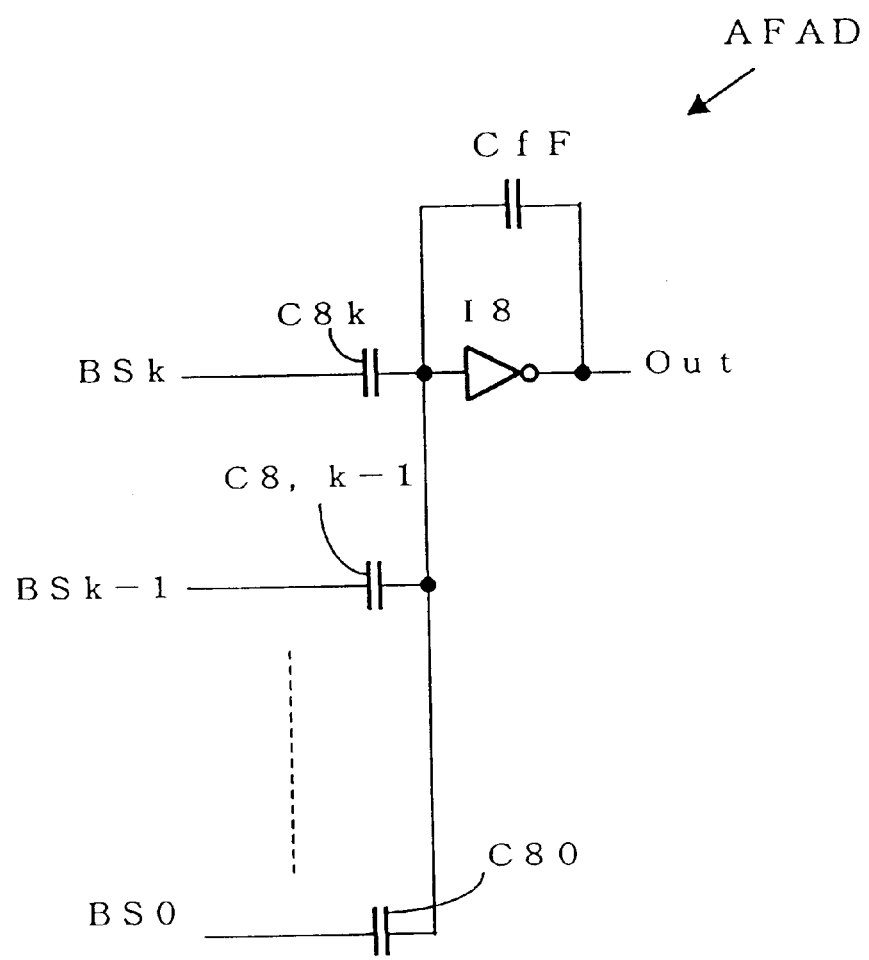
FIG. 17 is a circuit diagram showing a final addition circuit of the digital voltage addition circuit in FIG. 15.

FIG. 17 shows the final adder AFAD in FIG. 15. The final adder AFAD includes a capacitive array consisting of a capacitances C80 to C8k. An output of the capacitive array is input to a MOS inverting amplifier 18, an output of I8 is fed through a feedback capacitance CfF to its input. The capacitances have capacities corresponding to weights of the bits BS0 to BSk, and a capacity of the CfF is equal to the total capacity of the capacitances C80 to C8k. Thus, an output Out of the final adder AFAD is a weighted addition as shown in the formula (5).

$$Out = -\frac{\sum_{j=0}^{k} BSj \cdot C8j}{CfF} + 2 \cdot Vb = \frac{\sum_{j=0}^{k} \sum_{i=1}^{m}(bij \cdot VH - \overline{bij} \cdot VL) \cdot C8j}{n \cdot CfF} \quad (5)$$

The total capacity of the capacitances decreases and the circuit size becomes small by the weighting at the final adder AFAD.

Figure 18:
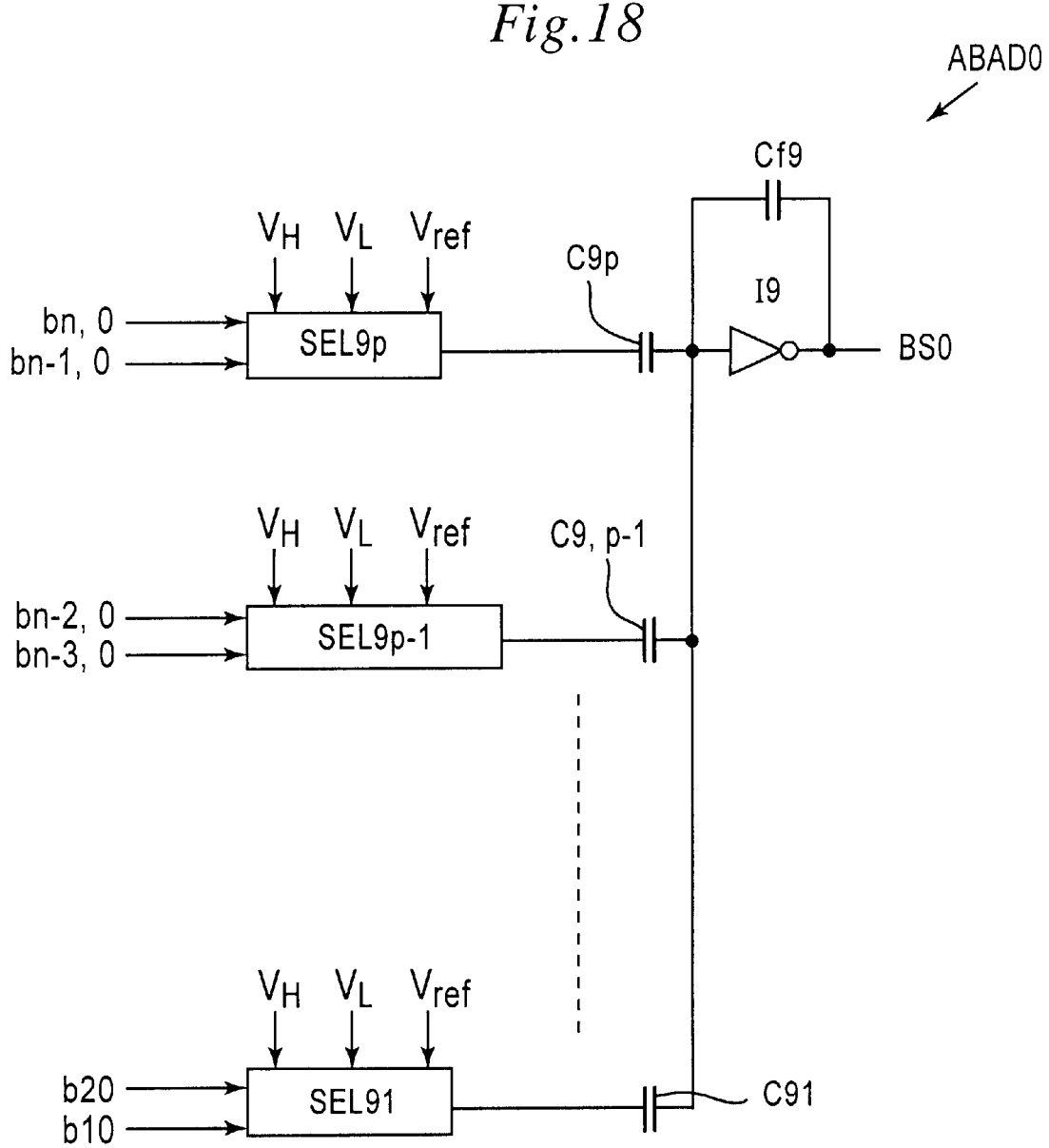
FIG. 18 is a circuit diagram showing another bit addition circuit of the digital voltage addition circuit in FIG. 15.

FIG. 18 shows a variation of a bit-addition circuit ABAD0. A plurality of selectors SEL91 to SEL9p are provided each corresponding to pairs of exclusive-or circuits. The selector SEL91 outputs a 3-levels voltage equivalent to 2 bits input b10 and b20. The selector SEL91 is controlled by the 2 bits input. The selector SEL91 receives the high reference voltage VH, medium reference voltage Vref and the low reference voltage VL, and outputs VL when b10=b20=1, Vref when one is "1" and the other is "0", and VL when b10=b20=0.

Figure 19:
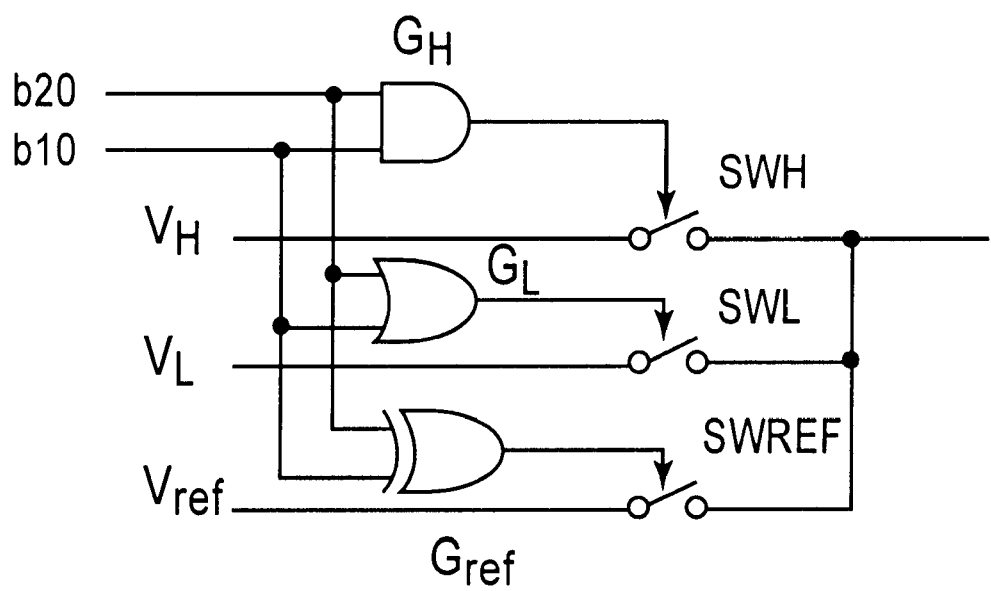
FIG. 19 is a circuit diagram showing a logic circuit of the bit addition circuit in FIG. 16.

FIG. 19 is a circuit diagram showing a logic circuit which performs the calculation of the 3-levels selector SEL9P. The output bits b10 and b20 are input to an AND gate GH, a NOR gate GL and an EX-OR gate, parallelly. These logic gates controls switches SWH, SWL and SWREF, respectively, which receive VH, VL and Vref, respectively. Thus, the 3-levels output is realized, and number of input lines decreases.

Figure 20:
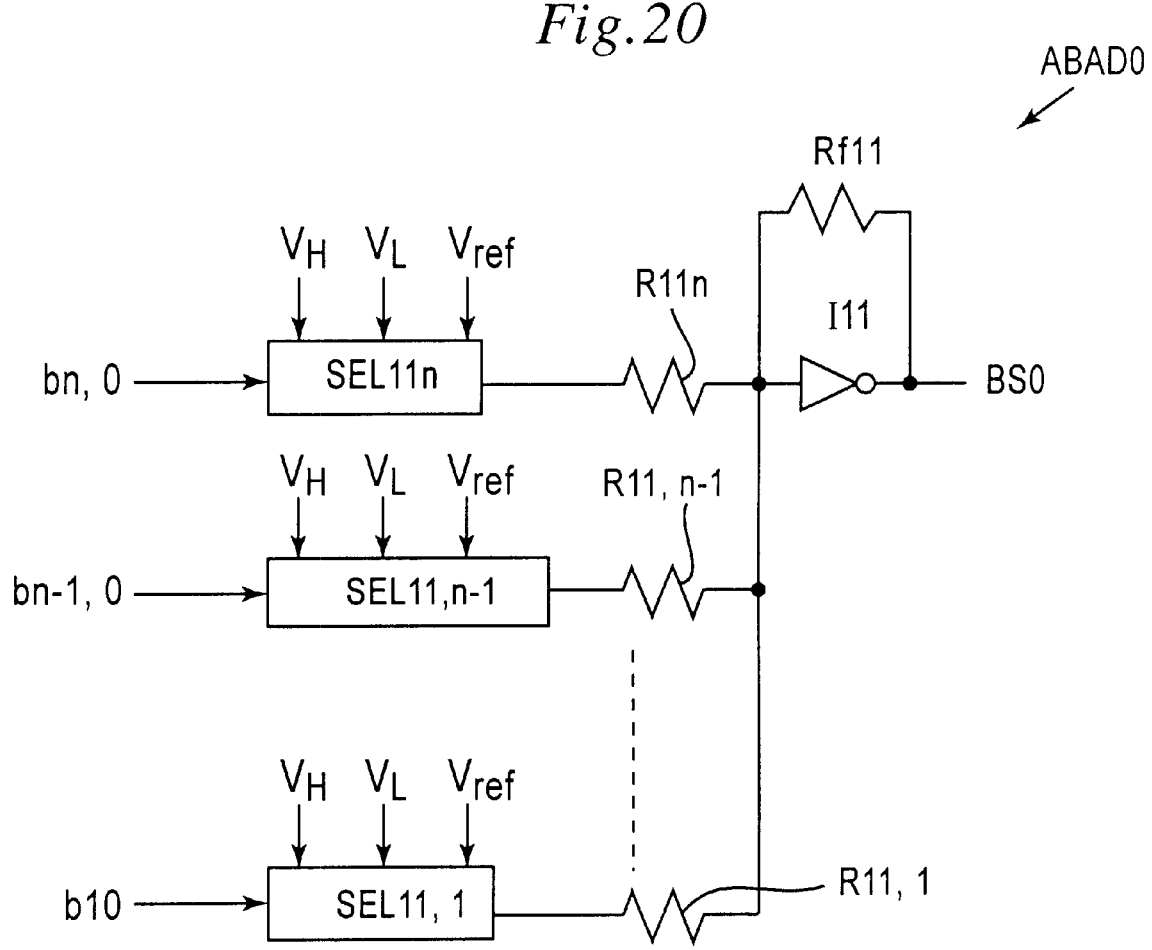
FIG. 20 is a circuit diagram showing a bit addition circuit of another digital voltage addition circuit.
Figure 21:
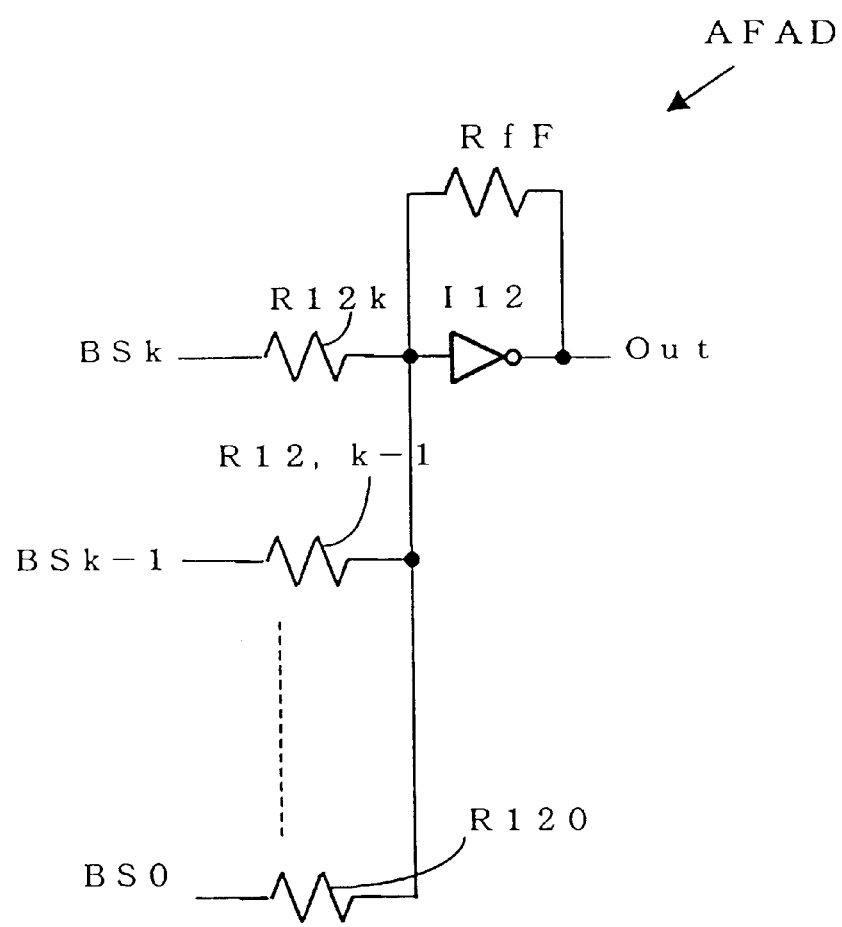
FIG. 21 is a circuit diagram showing a final addition circuit of the digital voltage addition circuit in FIG. 20.
Figure 22:
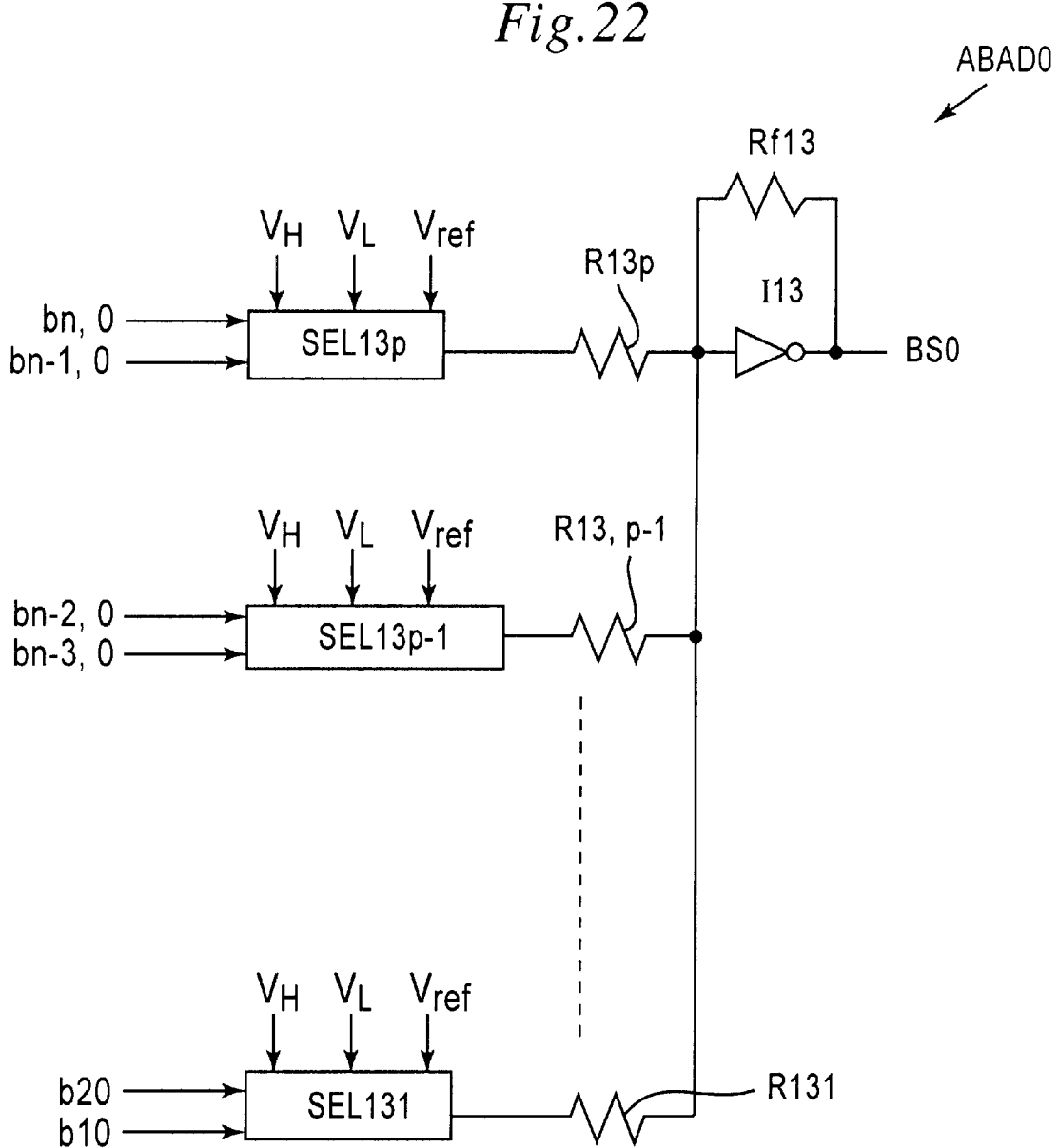
FIG. 22 is a circuit diagram showing a variation of the bit addition circuit in FIG. 20.

FIGS. 20 to 22 show circuits for another adder of digital type which performs bit addition and the final addition by circuitry components of resistances. FIG. 20 shows a bit-addition circuit ABAD0. The bit-addition circuit ABAD0 includes selectors SEL11,1 to SEL11n each of which outputs VH or VL alternatively. Outputs of the selectors SEL11,1 to SEL11n are connected to resistances R11,1 to R11n, respectively, of a resistance array. An output of the resistance array is input to an inverting amplifier I11 consisting of a MOS inverter, an output of which is fed through a resistance Rf11 to its input. The resistances R11,1 to R11n have the same resistance value and the resistance Rf11 has a resistance value equal to the total resistance of the resistances R11,1 to R11n. Thus, an output of the bit-addition circuit Baad0 is expressed as in the formula (6)

$$BS0 = -\frac{\sum_{i=1}^{n}(bi0 \cdot VH - \overline{bi0} \cdot VL)}{\frac{R11i}{Rf11}} + 2 \cdot Vb = \qquad (6)$$

$$-\frac{\sum_{i=0}^{n}(bi0 \cdot VH - \overline{bi0} \cdot VL)}{n} + 2 \cdot Vb$$

Other bit-addition circuits ABAD1 to ABADk are similar to ABAD0, so description therefor are omitted.

FIG. 22 is a circuit diagram showing a variation of the bit-addition circuit ABAAD0 including selectors SEL131 to SEL13p. The selector SEL131 receives input bits b10 and b20 as control signals and outputs a 3-levels output. The reference voltages VH, VL and Vref are input to the selector SEL131 which selectively outputs one of the reference voltages in response to the input bits b10 and b20. When b10=b20=1, VH is output, when b10≠b20, Vref is output, and when b10=b20=0, VL is output.

It may also possible to combine bit-addition circuits of capacitance-type (FIGS. 5 to 7, FIG. 16 and FIG. 18) and a final adder (FIG. 21) of a resistance-type, or to combine bit-addition circuits of resistance-type (FIGS. 20 and 22) and a final adder (FIG. 21) of a capacitance-type.

Figure 23:
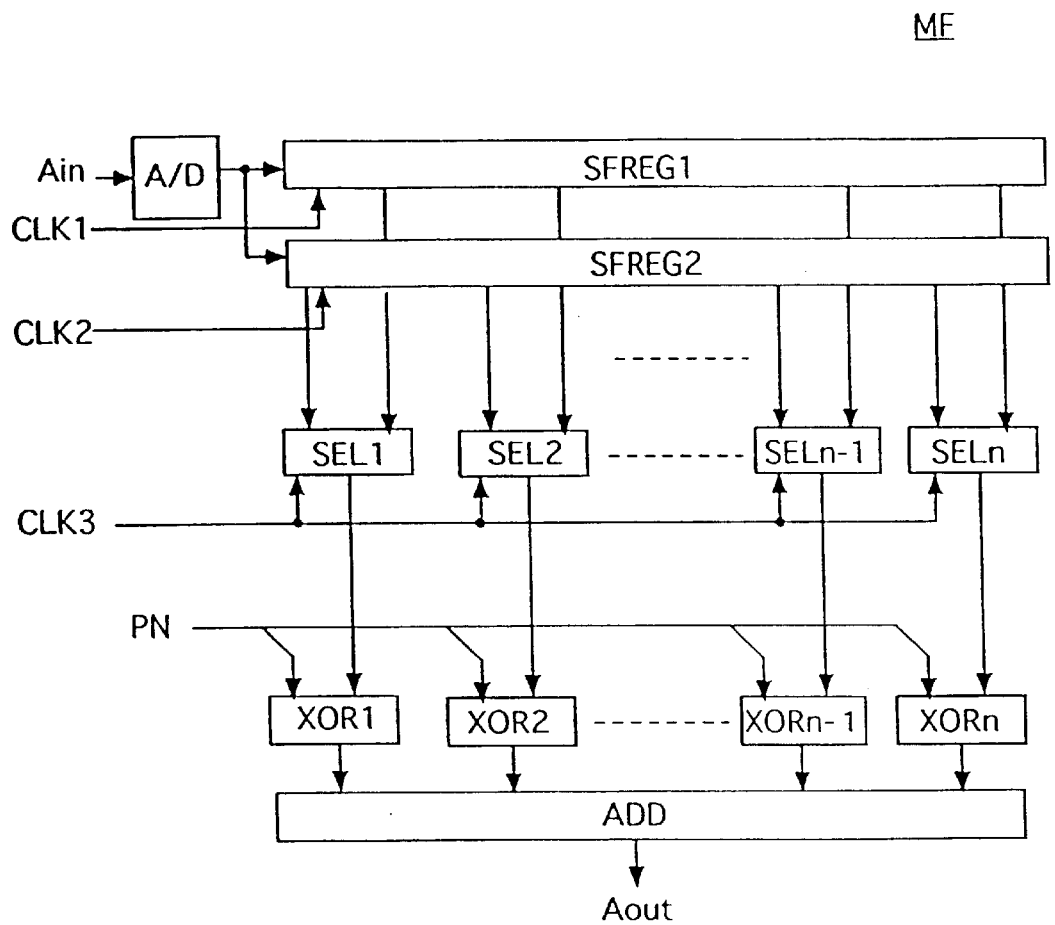
FIG. 23 is a block diagram showing a second embodiment of the matched filter circuit.
Figure 23:
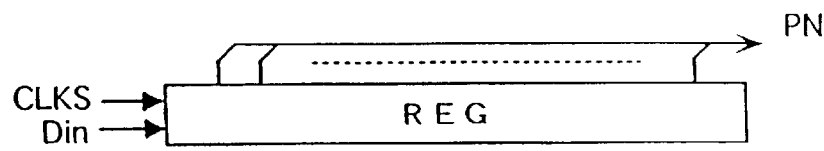

FIG. 23 is a block diagram showing a second embodiment of the matched filter MF. An analog input voltage Ain is converted into a digital voltage by an analog to digital converter (A/D) and then input to first stages of shift-registers SFREG1 and SFREG2. The shift-registers SFREG1 and SFREG2 shift the input voltages toward the last stages in response to the clock pulses CLK1 and CLK2, respectively. A spreading code PN is input from a register REG to exclusive-or circuits XOR1 to XORn. Differently from the first embodiment, the spreading code PN is not shifted. Outputs of the shift registers SFREG1 and SFREG2 are input to selectors SEL1 to SELn similar to those in the first embodiment. Similarly to the first embodiment, exclusive-or circuits XOR1 to XORn and adder ADD are provided.

What is claimed is:

1. A matched filter circuit comprising:
   an analog to digital (A/D) converter that receives an input voltage and outputs a digital voltage;
   a first set of a plurality of registers that successively hold said digital voltage in response to a first sampling clock;
   a second set of a plurality of registers that successively hold said digital voltage in response to a second sampling clock;
   a set of selectors that selectively outputs one of a first data output from said first set of registers and a second data output from said second set of registers;
   a circulative shift register having stages corresponding to said set of selectors, each of said stages holding one bit data of PN code sequence corresponding to one of said set of selectors;
   a plurality of exclusive-or circuits each of which calculates exclusive-or of each bit of output from said set of selectors and said one bit held in said stage; and
   an analog adder which calculates sum of outputs of said exclusive-or circuits up.

2. A matched filter circuit of claim 1, wherein said analog adder comprises:
   an analog bit adder (AADD1 to AADDk) which sums each of corresponding bits of equivalent weights of said outputs of said exclusive-or circuits; and
   a weighting addition circuit (WADD) which weights a summation of each bit of the outputs of the exclusive-or circuits and sums a weighted summation to create a total summation.

3. A matched filter circuit of claim 1, wherein said analog adder comprises a parallel counter.

4. A matched filter circuit of claim 1, wherein said analog adder comprises an analog current adder which sums outputs of said exclusive-or circuits up and outputs a current corresponding to said sum.

5. A matched filter circuit of claim 4, wherein said analog current adder comprises:
   a plurality of switches switched by said bits of said digital voltage, outputs of which being commonly connected to an output;
   a plurality of current sources corresponding to weights of said bits of said digital voltage which are connected to inputs of corresponding switches of said plurality of current sources;
   whereby a summation of said currents through said switches closed is output from said output connected to said outputs of said switches.

6. A matched filter circuit of claim 4, wherein said analog current adder comprises:
   a plurality of first switches switched by said bits of said digital voltage, outputs of which being commonly connected to an output;
   a plurality of second switches corresponding to said first switches which are reversely switches to said first;
   a plurality of current sources corresponding to weights of said bits of said digital voltage which are connected to inputs of said corresponding first and second switches of said plurality of current sources; and
   a subtraction circuit which subtracts said current summation of the second switches from said current summation of said first switches.

7. A matched filter circuit of claim 4, wherein said analog current adder comprises:

a plurality of switches switched by said bits of said digital voltage, outputs of which being commonly connected to an output;

a plurality of current sources of a predetermined current which are connected to inputs of corresponding switches of said plurality current sources; and a plurality of current amplifiers corresponding to weights of said bits of said digital voltage which weight said current flowing through said switches by weights of corresponding bits.

8. A matched filter circuit of claim 1, wherein one of said first and second sets of first and second sets of the plurality of registers is selectively utilized in time-sharing manner.

9. A matched filter circuit of claim 8, wherein said circulative shift register shifts said one bit data of the PN code sequence held in said stages synchronously with one of said first sampling clock and said second sampling clock.

10. A signal reception apparatus including said matched filter circuit of claim 1, comprising:

a peak detection portion that detects a correlation peaks of an output of said matched filter and determine a timing for holding said output; and a current driven holding circuit that holds said output of said matched filter at said timing determined by said peak detection portion.

* * * * *